(12) United States Patent
Kim et al.

(10) Patent No.: US 11,417,438 B2
(45) Date of Patent: Aug. 16, 2022

(54) METHOD FOR PRODUCING SOLIDIFYING MATERIAL FOR RADIOACTIVE WASTE DISPOSAL VIA RECYCLING OF RADIOACTIVE CONCRETE AND METHOD FOR DISPOSING OF RADIOACTIVE WASTE USING THE SAME

(71) Applicant: KOREA INSTITUTE OF CIVIL ENGINEERING AND BUILDING TECHNOLOGY, Goyang-si (KR)

(72) Inventors: Do Gyeum Kim, Goyang-si (KR); Eun A Seo, Goyang-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 1197 days.

(21) Appl. No.: 16/195,021

(22) Filed: Nov. 19, 2018

(65) Prior Publication Data

US 2020/0161014 A1 May 21, 2020

(51) Int. Cl.
*G21F 9/30* (2006.01)
*C04B 28/14* (2006.01)
*C04B 7/47* (2006.01)
*C04B 7/44* (2006.01)

(52) U.S. Cl.
CPC ............... *G21F 9/304* (2013.01); *C04B 7/44* (2013.01); *C04B 7/47* (2013.01); *C04B 28/141* (2013.01)

(58) Field of Classification Search
CPC .. C04B 7/44; C04B 7/47; C04B 7/246; C04B 18/167; C04B 28/141; C04B 2111/00767; G21F 9/304; Y02P 40/10; Y02W 30/91
See application file for complete search history.

(56) References Cited

FOREIGN PATENT DOCUMENTS

| JP | 3175629 B2 * | 6/2001 |
|---|---|---|
| KR | 10-2004-0087061 | 10/2004 |
| KR | 10-0768093 | 10/2007 |
| KR | 10-1061480 | 9/2011 |
| KR | 10-2017-0080341 | 7/2017 |

* cited by examiner

*Primary Examiner* — Anthony J Green
(74) *Attorney, Agent, or Firm* — Kile Park Reed & Houtteman PLLC

(57) ABSTRACT

In accordance with the present invention, provided is a method for producing a solidifying material for radioactive waste disposal, the method including a first step (S100) of pulverizing radioactive concrete waste and separating aggregates and paste and a second step (S200) of using the paste to produce a solidifying raw material, wherein the second step (S200) includes a calcination treatment step (S210) of calcining a mixture obtained by mixing an additional material with the paste; a sintering treatment step (S220) of sintering the mixture in a sintering furnace after the calcination treatment step (S210); and a rapid-cooling treatment step (S230) of rapid-cooling the mixture after the sintering treatment step (S220) to produce a clinker.

10 Claims, 3 Drawing Sheets

METHOD FOR PRODUCING SOLIDIFYING MATERIAL FOR RADIOACTIVE WASTE DISPOSAL VIA RECYCLING OF RADIOACTIVE CONCRETE AND METHOD FOR DISPOSING OF RADIOACTIVE WASTE USING THE SAME

TECHNICAL FIELD

The present invention disclosed herein relates to the field of radioactive waste disposal, and more particularly, to a method for producing a solidifying material for radioactive waste disposal via recycling of radioactive concrete, and a method for disposing of radioactive waste using the same in which a solidifying material for radioactive waste disposal is produced via recycling of radioactive concrete and radioactive waste can be disposed of using the solidifying material, thereby being capable of achieving low-cost, high-efficiency waste disposal.

BACKGROUND ART

Diverse radioactive wastes including concrete, iron materials, combustible materials, incombustible materials and so on are generated in the process of dismantling nuclear power plants.

Among those, concrete waste accounts for 70% or more of the total waste, which is the largest amount.

In the case of the concrete waste generated in the process of dismantling nuclear power plants, the radioactivity level greatly varies depending on the location and usage thereof. However, in most cases except for barrier walls surrounding a reactor, contamination due to radioactive materials or radioactivation in which a material is converted to a radioactive material by neutrons hardly occurs.

However, since concrete accounts for the largest volume among the nuclear waste, there is a need to save the waste disposal cost of the concrete through development of a technique capable of properly disposing of the waste.

A typical method for solidifying the waste generated when dismantling the nuclear power plant is vitrification, but vitrification is an optimal method for solidification of high-level waste.

In the case of Republic of Korea, since it is considered that there is almost no high-level waste except for the nuclear fuel used, the vitrification method has disadvantages such as being expensive and low efficiency for medium- and low-level waste.

In addition, vitrification is costly, and has a disadvantage in that the process and treatment thereof are difficult since it is a method in which a glass medium is melted together with the incinerated radioactive waste in a melting furnace, and then solidified at room temperature to make glass.

A prior art list related to the conventional radioactive concrete waste disposal is as follows.

Title of Invention: Method for producing low carbon recycled cement using waste concrete powder
Korean Patent Application number/date: 10-2015-0191759/Dec. 31, 2015.
Title of Invention: Method for vitrifying medium- and low-level radioactive waste using iron-phosphate glass
Korean Patent Application number/Date: 10-2006-0106203/Oct. 11, 2007.

DISCLOSURE OF THE INVENTION

Technical Problem

The present invention has been made to solve the problems of the conventional method for radioactive concrete disposal described above. An aspect of the present invention is to provide a method for producing a solidifying material for radioactive waste disposal via recycling of radioactive concrete in which a solidifying material to be used for medium- and low-level radioactive waste disposal is produced via recycling of radioactive concrete, and to a disposal method for radioactive waste using the same.

Another aspect of the present invention is to provide a method for producing a solidifying material for radioactive waste disposal via recycling of radioactive concrete, in which aggregate not including a radioactive material is recycled in the recycling process of radioactive concrete, thereby being capable of increasing the recycling rate of resources and reducing the amount of waste to improve the disposal efficiency of the radioactive material, and to a method for disposing of radioactive waste using the same.

Still another aspect of the present invention is to provide a method for producing a solidifying material for radioactive waste disposal via recycling of radioactive concrete, by which the physical properties of the solidifying material to be used for radioactive waste disposal are stably improved to raise initial reactivity and the medium and long term reaction is minimized, thereby being capable of stably disposing of waste, and to a method for disposing of radioactive waste using the same.

Technical Solution

In accordance with an embodiment of the present invention, provided is a method for producing a solidifying material for radioactive waste disposal, the method including: a first step (S100) of pulverizing radioactive concrete waste and separating aggregate and paste; and a second step (S200) of using the paste to produce a solidifying raw material, wherein the second step (S200) includes: a calcination treatment step (S210) of calcining a mixture obtained by mixing an additional material with the paste; a sintering treatment step (S220) of sintering the mixture in a sintering furnace after the calcination treatment step (S210); and a rapid-cooling treatment step (S230) of rapid-cooling the mixture to produce a clinker after the sintering treatment step (S220).

The second step (S200) may further include, after the rapid-cooling treatment step (S230), a solidifying raw material preparation step (S240) which pulverizes the clinker and mixing dihydrate gypsum to produce the solidifying raw material.

The additional material may include limestone and iron oxide.

The additional material may further include an alkali flux.

The paste may include $SiO_2$ in an amount of 15 wt % to 30 wt %.

The mixture may have a lime saturation factor (LSF) of 0.83 to 1.00, a silica modulus (SM) of 2.3 to 3.5, and an iron modulus (IM) of 1.2 to 2.2.

The alkali flux may be sodium sulfate, wherein the sodium sulfate may have a weight % of 1.5 to 3.5 relative to the clinker.

The fineness of the clinker constituting the solidifying raw material may be 2000 Blaine to 5000 Blaine.

In accordance with another embodiment of the present invention, provided is a method for disposing of radioactive waste using a solidifying material produced by using the method for producing a solidifying material for radioactive waste disposal, the method comprising: receiving radioactive waste in a waste disposal container and solidifying the radioactive waster by adding the solidifying material to the radioactive waste.

Aggregate which is not radioactivated among the aggregate may be utilized as recycled aggregate.

Advantageous Effects

In accordance with the present invention, there is an effect that radioactive concrete may be recycled to produce a solidifying material to be used for medium- and low-level radioactive waste disposal, thereby being capable of resource recycling and waste disposal at the same time.

In accordance with the present invention, there is an effect that aggregate not including a radioactive material is separated and recycled in the recycling process of radioactive concrete, thereby increasing the recycling rate of resources and reducing the amount of waste to be capable of improving the disposal efficiency of a radioactive material.

In accordance with the present invention, there is an effect that the physical properties of a solidifying material to be used for radioactive waste disposal are stably improved to increase initial reactivity and minimize the medium and long term reaction, thereby being capable of stable waste disposal.

MODE FOR CARRYING OUT THE INVENTION

Figure 1:
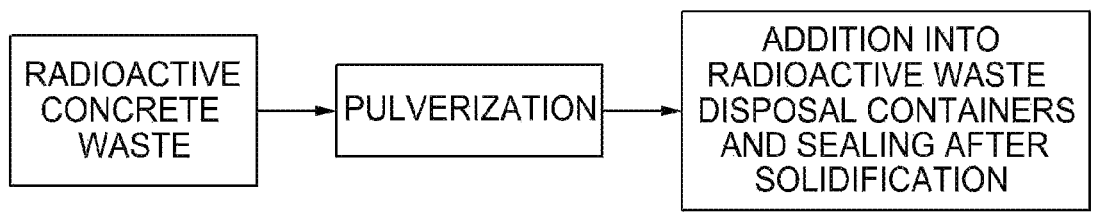
FIG. 1 is a view showing a disposal process of conventional radioactive concrete.

Embodiments of a method for producing a solidifying material for radioactive waste disposal via recycling of radioactive concrete and a method for disposing of radioactive waste in accordance with the present invention will be described in detail with reference to the accompanying drawings, and in describing the present invention with reference to the accompanying drawings, the same or corresponding components are denoted by the same reference numerals, and redundant description thereof will not be provided herein.

In addition, terms such as first and second used below are merely reference numerals for distinguishing the same or corresponding components, and the same or corresponding components are not limited by the terms of first, second, and the like.

In addition, the term "coupling", in the contact relationship between the respective components, does not mean only that the components are in direct physical contact with each other, but it is used as a concept including the case where other components are interposed between the respective components and the components are in contact with the other components.

Figure 2:
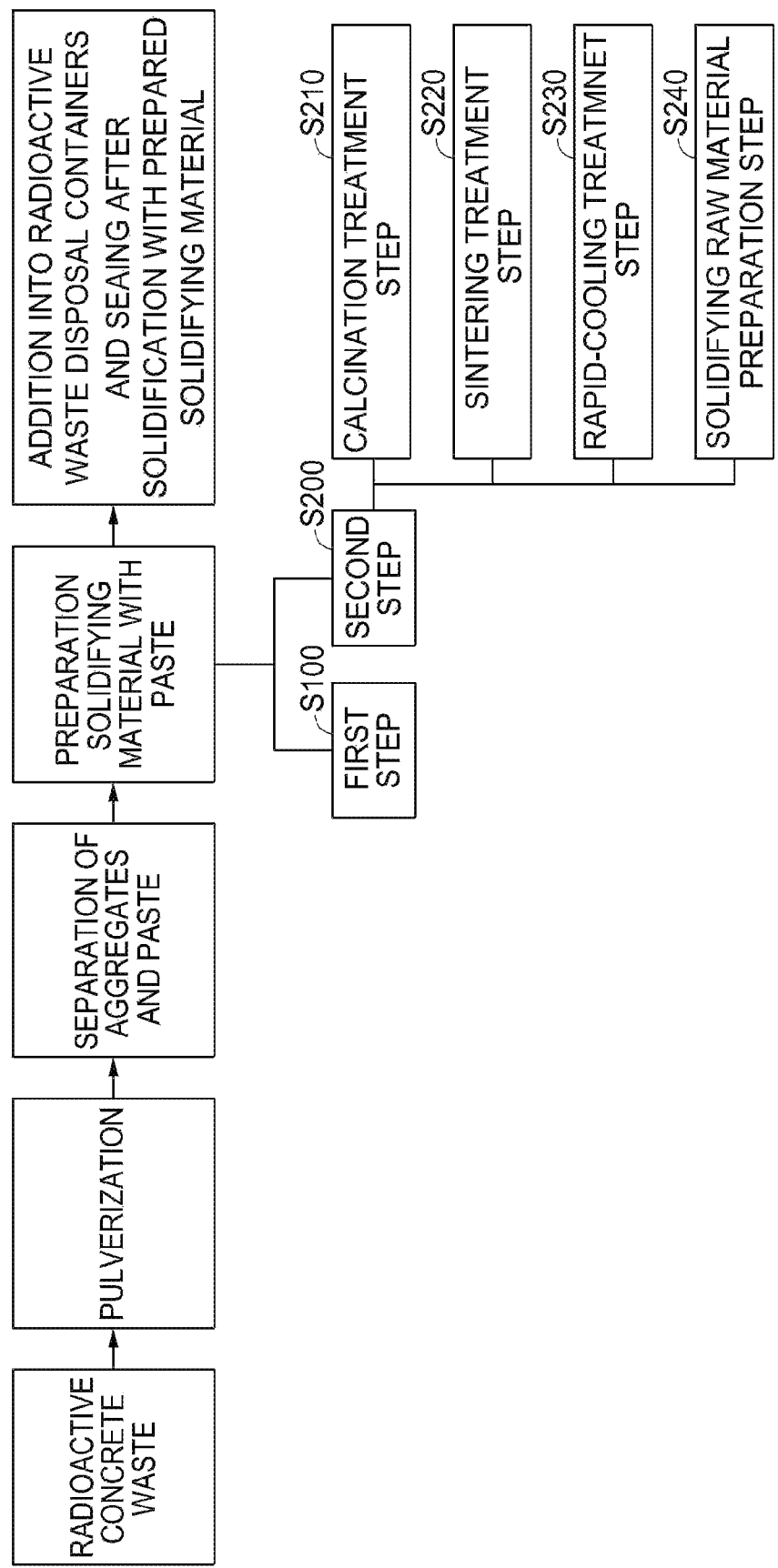
FIG. 2 is a view showing a process of producing a solidifying material via recycling of radioactive concrete, and disposing of radioactive waste by using the solidifying material produced, in accordance with an embodiment of the present invention.
Figure 3:
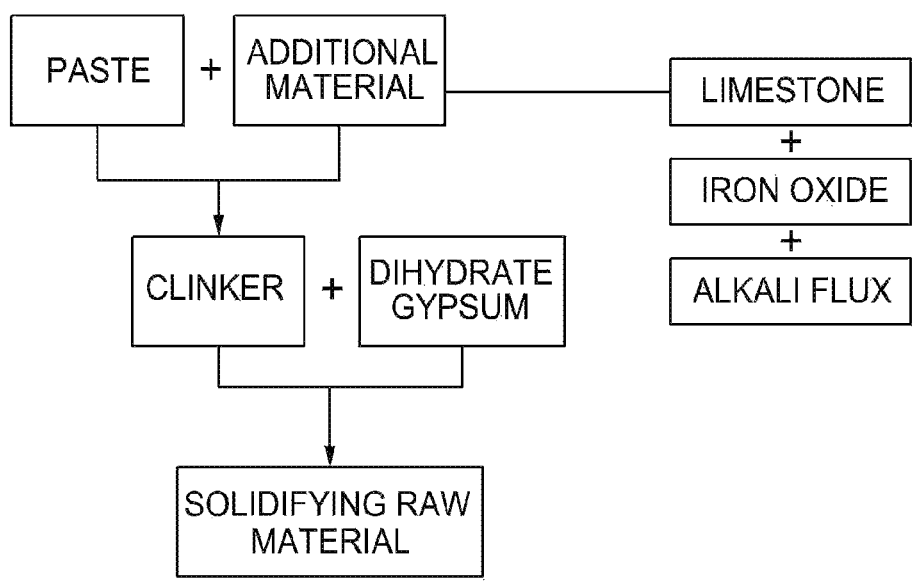
FIG. 3 is a block diagram for a solidifying material in accordance with an embodiment of the present invention.

The present invention relates to a method for efficiently disposing of radioactive waste, by which producing a solidifying material can be produced by recycling radioactive concrete and disposing of radioactive waste by using the solidifying material produced (FIG. 2).

A method for producing a solidifying material for radioactive waste disposal in accordance with the present invention includes a first step (S100) of pulverizing radioactive concrete waste and separating aggregate and paste, and a second step (S200) of using the paste to produce a solidifying raw material (FIG. 2).

Generally, in the case of radioactive concrete exposed to neutrons, radioactive elements (cobalt, europium) are mostly present in a paste portion, and are not included in an aggregate portion which account for a volume of 60% or more in concrete.

Therefore, the aggregate and the paste included in radioactive concrete are separated, and then the aggregate is recycled as clean aggregate and the paste is recycled as a solidifying material for radioactive waste disposal, so that the volume of concrete waste to be disposed of may be reduced to 30% or less.

It is preferable that the aggregate be separated until the amount of $SiO_2$ included in the paste reaches 15 wt % to 30 wt %.

The second step (S200) may include a calcination treatment step (S210) of calcining a mixture obtained by mixing an additional material with the paste, a sintering treatment step (S220) of sintering the mixture in a sintering furnace after the calcination treatment (S210), a rapid-cooling treatment step (S230) of rapid-cooling the mixture after the sintering treatment step (220) to produce a clinker, and a solidifying raw material preparation step (240) of producing a solidifying material by pulverizing the clinker and mixing a dihydrate gypsum to produce a solidifying raw material (FIG. 2).

In the calcination treatment step (210), the mixture is dried and pulverized, and then calcination treatment is performed at a temperature of 900° C. to 1000° C.

In the sintering treatment step (S220), the mixture subjected to the calcination treatment step is sintered in the sintering furnace at a temperature of 1250° C. to 1350° C.

The mixture subjected to the sintering treatment step (S220) is rapid-cooled to produce a clinker (S230).

The clinker is pulverized to form a solidifying raw material (S240).

The fineness of the clinker constituting the solidifying raw material is preferably 2000 Blaine to 5000 Blaine.

The solidifying raw material has properties of hydraulic regenerated cement and is added to the waste disposal container together with the radioactive waste and solidified as described later.

In the case of filling the waste disposal container by using the solidifying material in accordance with the present invention, it was possible to secure a strength of 3.44 (MPa) or more as prescribed by the law (regulations on radioactive waste acquisition method).

The additional material in accordance with the present invention may include limestone and iron oxide.

In addition, the additional material may further include an alkali flux.

In this case, the alkali flux may be sodium sulfate, and the sodium sulfate preferably have a weight % of 1.5 to 3.5 relative to the clinker.

Generally, the alkali flux added to a sintering process at a high temperature reacts with calcium oxide or aluminum oxide to produce a crude clinker mineral, thereby contributing to exhibition of the early strength of cement.

However, the alkali flux has a disadvantage of shortening the solidifying time of cement and adversely affecting the final strength in a long-term viewpoint. Therefore, it is general that the alkali flux is not added in the production of the cement.

However, the solidifying material used in radioactive waste disposal, unlike general cement, is required to secure stability which is capable of securing physical properties of strength manifestation as a stable solidifying material in the early stage and minimizing occurrence of cracks due to shrinkage or crystal structure change after the early reaction.

Therefore, in the present invention, unlike general cement, the alkali flux is added in the production of the solidifying material, thereby securing an effect that the effect of early strength manifestation and the long-term reactivity are lowered to be capable of stable waste storage.

Sodium sulfate is a compound of alkali ($Na_2O$) and sulfide ($SO_3$), and may be liquefied at a low temperature to serve as a flux for lowering the sintering temperature of the clinker. Accordingly, the sodium sulfate may provide an effect in which the sintering temperature of the clinker is lowered by 100° C. or more compared with the sintering temperature of a general Portland cement clinker.

In addition, since the sodium sulfate serving as a crude flux includes sulfide ions, soluble anhydrous gypsum is formed at a high temperature in the sintering process, and thus an expandable Ettringite hydrate is formed at the time of hydration to obtain a shrinkage reduction effect of the cured solidifying material.

It is preferable that the sodium sulfate be included in an amount of 1.5 wt % to 3.5 wt % relative to the clinker.

The mixture in accordance with the present invention preferably have a lime saturation factor (LSF) of 0.83 to 1.00, a silica modulus (SM) of 2.3 to 3.5, and an iron modulus (IM) of 1.2 to 2.2.

The solidifying material produced in accordance with an embodiment of the present invention is added to the waste disposal container together with radioactive waste, thereby being capable of exhibiting the strength prescribed by the law.

While the present invention has been particularly shown and described with reference to exemplary embodiments thereof, it is to be understood that the invention is not limited to the disclosed exemplary embodiments, but, on the contrary, it is to be understood that the technical scope of the present invention and the technical spirit of the present invention are all included in the scope of the present invention.

The invention claimed is:

1. A method for producing a solidifying material for radioactive waste disposal, the method comprising:
    a first step (S100) of pulverizing radioactive concrete waste and separating aggregates and paste; and
    a second step (S200) of using the paste to produce a solidifying raw material, wherein the second step (S200) comprises:
        a calcination treatment step (S210) of calcining a mixture obtained by mixing an additional material with the paste;
        a sintering treatment step (S220) of sintering the mixture in a sintering furnace after the calcination treatment step (S210); and
        a rapid-cooling treatment step (S230) of rapid-cooling the mixture to produce a clinker after the sintering treatment step (S220).

2. The method of claim 1, wherein the second step (S200) further comprises, after the rapid-cooling treatment step (S230), a solidifying raw material preparation step (S240) of pulverizing the clinker and mixing dihydrate gypsum to produce the solidifying raw material.

3. The method of claim 1, wherein the additional material comprises limestone; and an iron oxide.

4. The method of claim 3, wherein the additional material further comprises an alkali flux.

5. The method of claim 4, wherein the paste comprises $SiO_2$ in an amount of 15 wt % to 30 wt %.

6. The method of claim 5, wherein the mixture has a lime saturation factor (LSF) of 0.83 to 1.00, a silica modulus (SM) of 2.3 to 3.5, and an iron modulus (IM) of 1.2 to 2.2.

7. The method of claim 6, wherein the alkali flux is sodium sulfate,
    wherein the sodium sulfate has a weight % of 1.5 to 3.5 relative to the clinker.

8. The method of claim 7, wherein the fineness of the clinker constituting the solidifying raw material is 2000 Blaine to 5000 Blaine.

9. A method for disposing of radioactive waste using a solidifying material produced by using the method for producing a solidifying material for radioactive waste disposal of claim 7, the method comprising:
    receiving the radioactive waste in a waste disposal container (10) and solidifying the radioactive waste by adding the solidifying material to the radioactive waste.

10. The method of claim 9, wherein aggregate which is not radioactivated among the aggregate is utilized as recycled aggregate.

* * * * *